(12) United States Patent
Igarashi et al.

(10) Patent No.: US 11,453,334 B2
(45) Date of Patent: Sep. 27, 2022

(54) SOUND OUTPUT CONTROL SYSTEM

(71) Applicant: TOYOTA JIDOSHA KABUSHIKI KAISHA, Toyota (JP)

(72) Inventors: Ko Igarashi, Tokyo-to (JP); Naoki Nishimura, Tokyo-to (JP); Takahiko Kuwabara, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/355,313

(22) Filed: Jun. 23, 2021

(65) Prior Publication Data

US 2022/0001796 A1 Jan. 6, 2022

(30) Foreign Application Priority Data

Jul. 1, 2020 (JP) .............................. JP2020-114152

(51) Int. Cl.
*H04B 1/00* (2006.01)
*B60Q 5/00* (2006.01)
*G06F 3/16* (2006.01)
*H04R 3/00* (2006.01)
*H04R 1/02* (2006.01)
*H03G 3/00* (2006.01)

(52) U.S. Cl.
CPC .............. B60Q 5/005 (2013.01); G06F 3/165 (2013.01); H04R 1/025 (2013.01); H04R 3/00 (2013.01); *H04R 2499/13* (2013.01)

(58) Field of Classification Search
CPC ......... B60Q 5/005; G06F 3/165; H04R 1/025; H04R 3/00; H04R 2499/13
USPC ................................................... 381/86, 104
See application file for complete search history.

(56) References Cited

U.S. PATENT DOCUMENTS

2014/0227991 A1* 8/2014 Breton ................. G08G 1/0965
455/404.2

FOREIGN PATENT DOCUMENTS

JP H09-073588 A 3/1997

* cited by examiner

*Primary Examiner* — Ammar T Hamid
(74) *Attorney, Agent, or Firm* — Oliff PLC

(57) ABSTRACT

A controller executes output state control in which an output status of a sound signal outputted from a sound source device and that of a blowing sound outputted from a sounding device are controlled based on driving environment information. In the output state control, it is judged whether or not an output condition of the blowing sound is satisfied based on the driving environment information. If it is judged that the output condition is satisfied, a mute signal is outputted to a sound source device to mute the output of the sound signal and also a blowing signal including mute information is outputted to the sounding device. The mute information includes information on a start timing to output the blowing sound. The start timing is variably set in accordance with an importance of the information provided to an occupant of the vehicle.

6 Claims, 6 Drawing Sheets

SOUND OUTPUT CONTROL SYSTEM

CROSS-REFERENCE TO RELATED APPLICATION

The present application claims priority under 35 U.S.C. § 119 to Japanese Patent Application No. 2020-114152, filed Jul. 1, 2020, the contents of which application are incorporated herein by reference in their entirety.

TECHNICAL FIELD

Present disclosure relates to a sound output control system mounted on a vehicle.

BACKGROUND

JPH9-73588A discloses a sound processing device for a vehicle in which a muting function is installed. This conventional device mutes an output of the other sound signals when it outputs an alarm sound. A main object to output the alarm sound is to provide information to a driver of the vehicle. In this respect, the mute function allows the driver to notice the alarm sound by outputting this sound while muting the output of the other sound signals.

SUMMARY

Incidentally, there is a certain interval between a beginning of the muting and the outputting of the alarm sound. This interval should be long if reliable provision of the information is important. However, in this case, the provision of information is delayed by the interval. Therefore, it is required to develop a technique in consideration of such a trade-off problem.

It is an object of present disclosure to provide a technique capable of suppressing missing offer of the information during a mute period and suppressing the delay of the provision of the information.

A first aspect of the present disclosure is a sound output control system mounted on a vehicle.

The control system comprises a sound source device, a sounding device, an information acquisition device, and a controller.

The sound source device is configured to output a sound signal to a speaker.

The sounding device is configured to output a blowing sound inside a vehicle.

The information acquisition device is configured to obtain driving environment information of the vehicle.

The controller is configured to execute output state control in which an output status of the sound signal and the blowing sound based on the driving environment information.

In the output state control, the controller is configured to:
judge, based on the driving environment information, whether or not an output condition of the blowing sound is satisfied; and
if it is judged that the output condition is satisfied, output a mute signal to the sound source device to mute the output of the sound signal and also output a blowing signal including mute information to the sounding device.

The mute information includes information on a start timing to output the blowing sound.

The start timing is variably set in accordance with an importance of the information provided to an occupant of the vehicle.

A second aspect of the present disclosure further has the following feature in the first aspect:

The start timing is set to an earlier timing as the importance becomes higher.

A third aspect of present disclosure has the following further feature in the second aspect.

A mute period indicating a period during which the mute signal is outputted from the controller is shortened in accordance with an advance time of the start timing.

A fourth aspect of the present disclosure further has the following feature in the first aspect.

The start timing is set to a later timing as the importance becomes lower.

A fifth aspect of the present disclosure further has the following feature in the fourth aspect.

A mute period indicating a period during which the mute signal is outputted from the controller is extended in accordance with a postponement time of the start timing.

A sixth aspect of the present disclosure further has the following feature in the first aspect.

The start timing is calculated by adding a standby time, which is variably set in accordance with the importance, to a time at which the mute signal is outputted.

According to the present disclosure, the start timing is variably set in accordance with the importance of the information provided to the occupant of the vehicle. Therefore, for example, when the start timing is advanced, it is possible to minimize the missing offer of the urgent information and to provide the said information at an earlier timing. On the other hand, when the start timing is postponement, it is possible to suppress the provision of the less urgent information from being extremely delayed and provide the said information to the occupant reliably. As described above, it is possible to suppress the missing offer of the information during the mute period and also suppress the delay of the provision of the information.

DESCRIPTION OF EMBODIMENTS

Figure 1:
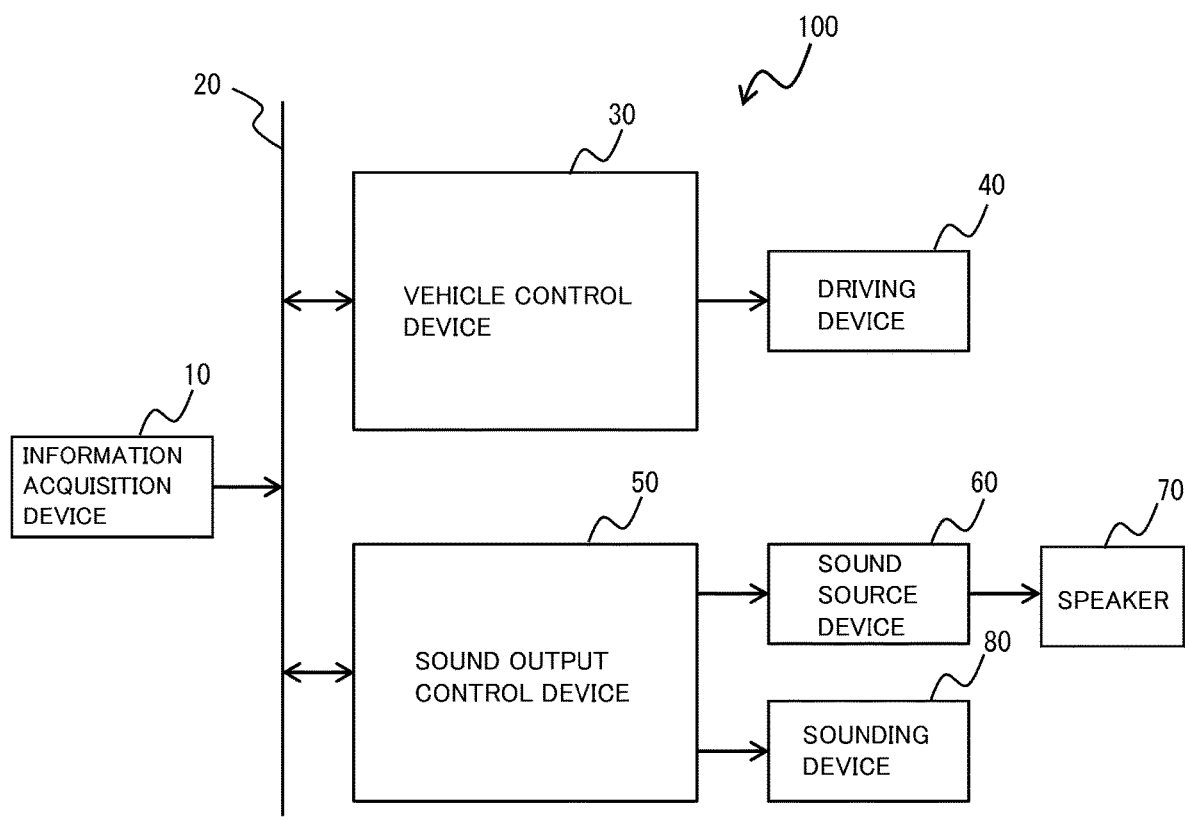
FIG. 1 is a diagram showing a configuration example in which a sound output control system according to an embodiment is applied to a vehicle.

Hereinafter, an embodiment of the present disclosure will be described referring to the drawings. It should be noted that the same signs are attached to the same elements in the respective drawings, and duplicate descriptions are omitted.

In addition, the present disclosure is not limited to the embodiment described below, and may be implemented in various aspects.

1. Configuration Example

1-1. Configuration Example of Vehicle

FIG. 1 is a diagram showing a configuration example in which a sound output control system according to the present embodiment is applied to a vehicle. It should be noted that only a configuration related to the present disclosure is depicted in FIG. 1.

Examples of a vehicle 100 shown in FIG. 1 include a vehicle using an engine as a power source, an electronic vehicle using a motor as a power source, and a hybrid vehicle including the engine and the motor. The motor is driven by a battery such as a secondary cell, a hydrogen cell, a metallic fuel cell, and an alcohol fuel cell.

The vehicle 100 has a configuration to execute automated driving control. The "automated driving control" is vehicle control in which part or all of driving operations performed by a driver of the vehicle 100 is automatically performed. The automated driving control includes drive control, braking control and steering control. In the example shown in FIG. 1, an information acquisition device 10, an in-vehicle network 20 (e.g., a CAN (Controller Area Network)), a vehicle control device 30 and a driving device 40 correspond to configurations to execute the automated driving control.

The information acquisition device 10 is a generic term for various sensors, various switches, a GPS (Global Positioning System) device and a communication device mounted on the vehicle 100. Examples of the various sensors include a powertrain-related sensor, a chassis-related sensor, a recognition-related sensor and an occupant-related sensor.

Examples of the powertrain-related sensor include a water temperature sensor. Examples of the chassis-related sensor include a wheel speed sensor, a yaw rate sensor and a steering torque sensor. Examples of the recognition-related sensor include a camera and a radar. The powertrain-related sensor and the chassis-related sensor acquire information indicating an internal status of the vehicle 100 and output the information to the network 20. The recognition-related sensor acquires information indicating an external status of the vehicle 100 and outputs the information to the network 20. Examples of the occupant-related sensor include a door sensor, a seatbelt sensor, a driver monitoring camera, and a steering touch sensor. The occupant-related sensor acquires information indicating a state of an occupant of the vehicle 100 including a driver, and outputs the information to the network 20.

Examples of the various switches include a body-related switch. Examples of the body-related switch include a parking braking switch, a headlight switch, and a wiper switch. The body-related switch outputs information indicating a working status of a body-related equipment to the network 20. The GPS device acquires information indicating an actual position of the vehicle 100, and outputs the information to the network 20. The communication device acquires communication information provided by an information providing system and outputs the information to the network 20. The communication information includes road traffic information such as traffic jam information, accident information, construction section information, lane regulation information, and the like. The communication information also includes weather information. The communication information also includes map information. The map information may be stored in a database mounted in the vehicle 100.

The various types of information mentioned above are generically referred to as "driving environment information" or the vehicle 100. The information acquisition device 10 obtains the driving environment information. The information acquisition device 10 also transmits the driving environment information to the vehicle control device 30 and the sound output controller 50 via the network 20.

The vehicle control device 30 is a microcomputer that includes at least one processor, at least one memory, and an input and output interface. The vehicle control device 30 acquires the driving environment information through the network 20 and the input and output interface and executes automated driving control. In the automated driving control, for example, a target trajectory is set. The target trajectory is a set of target positions at which the vehicle 100 should reach. The target positions are set at predetermined intervals (e.g., 1 meter) in an extending direction of the target trajectory. The target positions include a control target value of the driving device 40 that is set for each of the target positions. The control target value includes a target lateral location and target vehicle speed.

The driving device 40 includes a steering device, a driving device and a braking device. The steering device steers wheels of the vehicle 100. For example, the steering device includes an electric power steering (EPS: Electric Power Steering) device. The driving device is a power source for generating a driving force. Examples of the driving device include the engine and the motor. The braking device generates a braking force.

1-2. Configuration Example of the Sound Output Control System

In the example shown in FIG. 1, the sound output control system is composed of the information acquisition device 10, the sound output controller 50, a sound source device 60, a speaker 70 and a sounding device 80.

The sound output controller 50 is a microcomputer that includes at least one processor, at least one memory, and an input and output interface. The sound output controller 50 is connected to the information acquisition device 10 via the network 20. The sound output controller 50 executes output state control when an event occurs to output a blowing sound by the sounding device 80 (hereinafter also referred to as an "output event"). Details of the output state control will be described later.

The sound source device 60 is a generic term for a device that generates a sound signal, such as an audio device, a television and a car navigation device, excepting for the sounding device 80 described below. When the sound source device 60 is the audio device, the sound signal is also referred to as an audio signal. When the sound source device 60 is the television, the sound signal is also referred to as a television sound. When the sound source device 60 is the car navigation device, the sound signal is also referred to as a route guidance sound. The sound source device 60 outputs the sound signal to an amplifier (not shown). When the sound signal is output to the amplifier, the amplified sound signal is output from the speaker 70. The number of speakers 70 and amplifiers is not particularly limited, and the numbers of both speakers do not have to match.

The sounding device 80 is a device for outputting various types of the blowing sound to inside the vehicle 100. Examples of the blowing sound include an alarm sound to the occupant such as a notification of an approach of other vehicles, a notification of an unclosed state of a door, a notification of an unbelted state of a seat belt, and a notification of forgetting to turn off a headlight switch. Examples of the blowing sound also include a vehicle operation sound such as a turn sound and a sound effect such as a sound for guiding and supporting a recommended behavior of the occupant. When the blowing sound is a beep sound, various sounds are set based on combinations of long and short sounds and number of repetitions of these sounds. The beep sound may be followed by a messaging sound. In this case, the beep sound is combined with the messaging sound.

In the present embodiment, data of the blowing sound described above is stored in the memory of the sound output controller 50. When the output event occurs, a processor of the sound output controller 50 generates a blowing signal based on the data of the blowing sound corresponding to the output event and outputs it to the sounding device 80. The sounding device 80 incorporates a common configuration to output these blowing sounds. Examples of this generic configuration include an amplifier and a speaker.

2. Output State Control

The output state control is executed when the output event occurs. The generation of the output event is judged based on whether or not an output condition of the blowing sound is satisfied. This output condition is predetermined for each output event.

For example, the occurrence of the output event to notify the approach of other vehicles is judged by whether or not a relative distance between the vehicle 100 and the other vehicle is less than or equal to a threshold. Note that the relative distance is calculated based the information from the recognition-related sensor. The occurrence of the output event to notify the unbelted state of the seat belt is judged based on an output from the seat belt sensor. The occurrence of the output event to prompt the driver to wake up is judged based on whether or not an alertness level of the driver is equal to or lower than a threshold. Note that the alertness level is calculated by analyzing an image information from the driver monitor.

In the output state control, an output status of the sound signal from the sound source device 60 and that of the blowing sound from the sounding device 80 are controlled. The following describes the output state control.

2-1. Control Example

Figure 2:
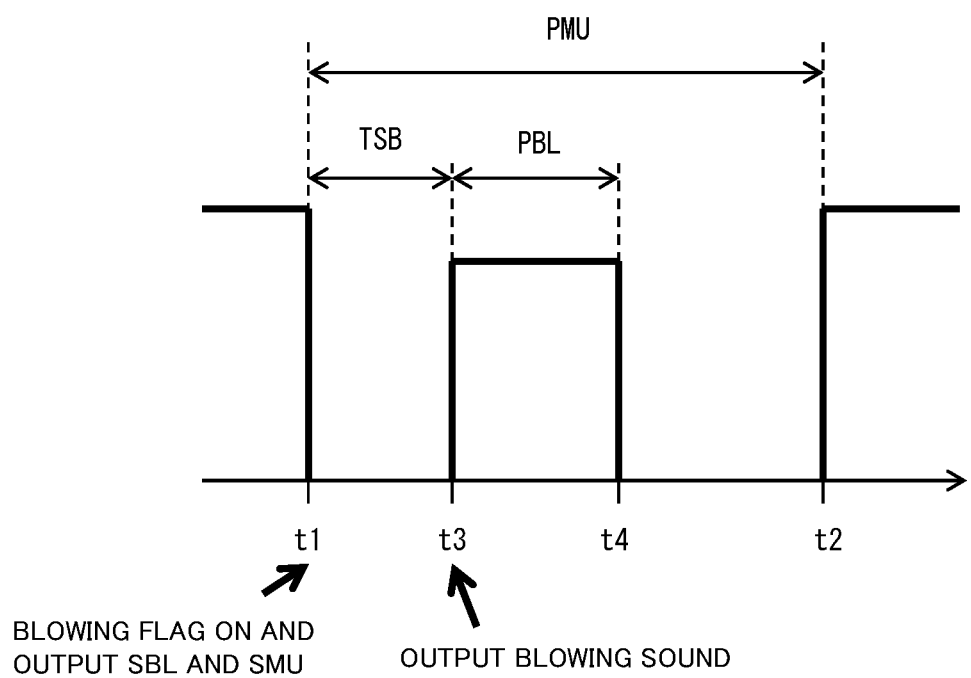
FIG. 2 is a time chart showing a comparative example of output state control according to the present embodiment.

FIG. 2 is a time chart showing a comparative example of the output state control according to the present embodiment. In the example shown in FIG. 2, the output event of the blowing sound has occurred (i.e., a blowing flag has been turned ON). Time t1 shown in FIG. 2 represents a time at which the output event has occurred. In this time t1, a signal SMU that mutes the output of the sound signal (hereinafter also referred to as a "mute signal") is generated. The mute signal SMU is outputted to the sound source device 60. The mute signal SMU is outputted from time t1 to time t2. A duration during which the mute signal SMU is being outputted is referred to as a "mute period PMU". In the example, the mute period PMU is constant.

In addition, a blowing signal SBL corresponding to the output event is also generated. The blowing signal SBL is outputted to the sounding device 80. The blowing signal SBL includes blowing information and mute information. Examples of the blowing information include data of the blowing sound corresponding to the output event. Examples of the mute information include data of a standby time TSB. The standby time TSB is a time that is counted from when the sounding device 80 receives the blowing signal SBL to when it starts to output the blowing sound. In the example shown in FIG. 2, an interval between time t1 and t3 corresponds to the standby time TSB.

The outputting of the blowing sound after a lapse of the standby time TSB takes place from time t3 to time t4. A period during which the blowing sound is being outputted is referred to as a "blowing period PBL". While the mute period PMU is constant, the blowing period PBL varies in accordance with the data of the blowing sound. This is because the blowing sound is predetermined for each output event.

2-2. Characteristic Control Example of Embodiment

In the example shown in FIG. 2, no sound from the sound source device 60 or the sounding device 80 is outputted during the standby time TSB. Therefore, it becomes easy for the occupant to notice the blowing sound outputted after the elapse of this standby time TSB. However, the standby time TSB can also be regarded as a period in which the provision of the information to the occupant is delayed. Then, in a case of providing urgent information, the existence of the standby time TSB is rather an obstacle.

In the output state control of the present embodiment, therefore, a length of the standby time TSB is changed in accordance with an importance of the output event (i.e., an importance of information to be provided). To "change the length of the standby time TSB in accordance with the importance" means to advance or postpone a start timing of the blowing sound according to the importance. This change is executed while setting the standby time TSB.

The changed standby time TSB (i.e., a standby time TSB* and TSB**, described later) is set in association with the output event. For example, the data of the changed standby time TSB is stored in the memory of the sound output controller 50 in a form of a database combined with the blowing sound data set for each output event. In this case, a certain output event is specified, the corresponding blowing sound data and standby time TSB data are specified at the same time.

Figure 3:
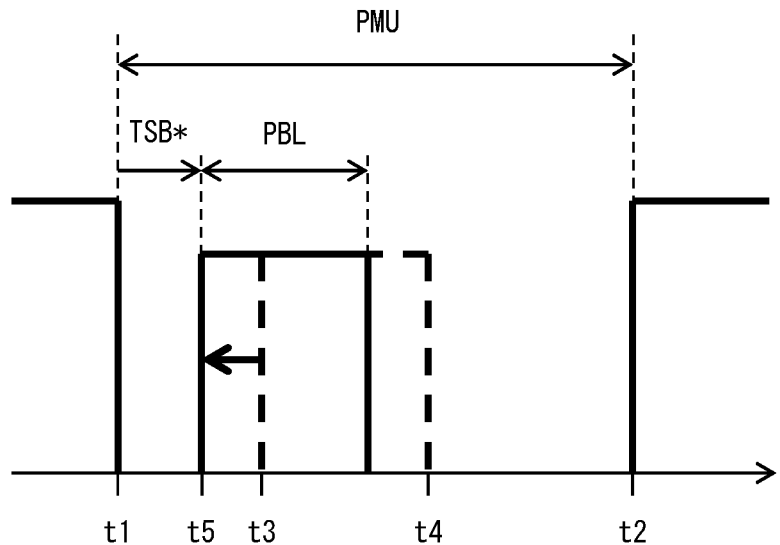
FIG. 3 is a time chart showing a first example in which a start timing of an output of a blowing sound is advanced.
Figure 4:
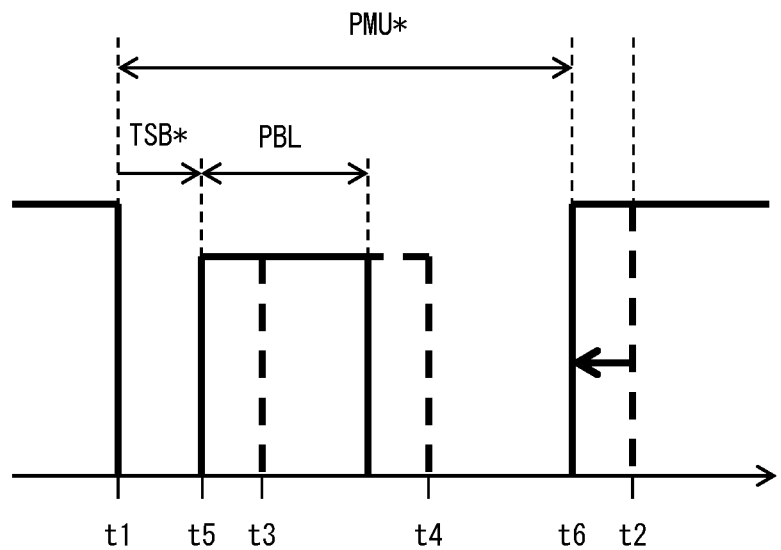
FIG. 4 is a time chart showing a second example in which the start timing is advanced.

FIG. 3 is a time chart showing a first example in which the start timing of the output of the blowing sound is advanced. FIG. 4 is a time chart showing a second example in which the start timing is advanced. As shown in FIGS. 3 and 4, a standby time TSB* is set in these cases. The standby time TSB* corresponds to a time difference from time t3 to t5. By setting the standby time TSB*, the blowing information is provided to the occupant at an earlier timing.

The blowing period PBL shown in FIGS. 3 and 4 is the same as that shown in FIG. 2. Therefore, when the standby time TSB* is set, an end of the outputting of the blowing sound is also advanced by the time difference (=t3−t5). FIG. 4 shows an example of shortening the mute period PMU by this time difference. In the example shown in FIG. 4, the mute period PMU* ends at time t6. The time difference from time t2 to t6 is equal to that from time t3 to t5. When the mute period PMU* is set, a restart of the sound signal output is also advanced.

Figure 5:
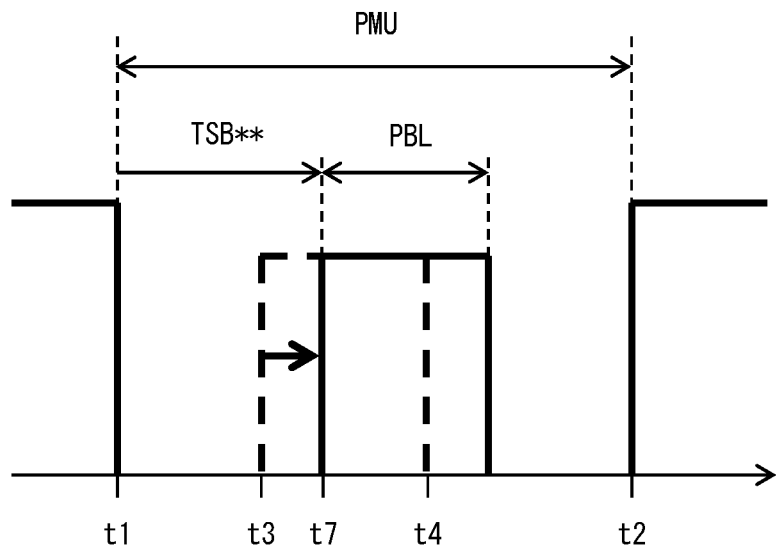
FIG. 5 is a time chart showing a first example in which the start timing is postponed.
Figure 6:
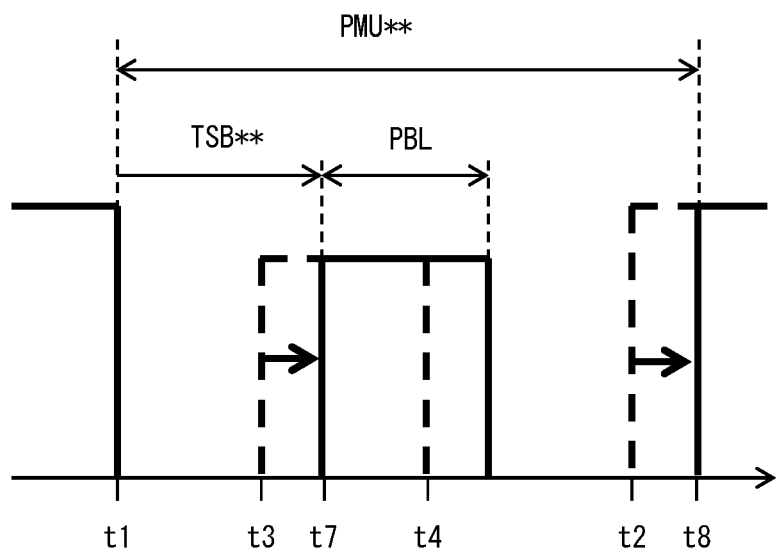
FIG. 6 is a time chart showing a second example in which the start timing is postponed.

FIG. 5 is a time chart showing a first example in which the start timing is postponed. FIG. 5 is a time chart showing a first example in which the start timing is postponed. As shown in FIGS. 5 and 6, a standby time TSB is set in these cases. The standby time TSB corresponds to the time difference from time t3 to t7. By setting the standby time TSB**, the blowing information is provided to the occupant at a later time.

In the example shown in FIG. 6, the mute period PMU is set. The mute period PMU ends at time t8. The time difference from time t2 to t8 is equal to that from time t3 to t7. When the mute period PMU** is set, the restart of the sound signal output is also postponed. The mute periods PMU, PUM* and PMU** are stored in the memory of the sound output controller 50 in association with the output event. These mute periods may be stored in combination with the data of the blowing sound and the standby time TSB.

2-3. Importance of the Output Event

As a case of providing the urgent information, it is assumed a case where an output event occurs to ensure the safety of the occupant urgently while the vehicle 100 is driving. Examples of such the output event include an event in which a front obstacle is recognized and an event in which the driving speed exceeding an upper limit is detected. In the event where no gripping status of the steering wheel or a decrease in the alertness level is detected, it may be judged whether or not the event corresponds to the output event to ensure the safety of the occupant urgently based on a comprehensive assessment combined with data indicating the internal status of the vehicle 100. In such a case, the start timing is advanced.

As a case of providing less urgent information, it is assumed a case where an output event occurs while the vehicle 100 is driving and there is less need to urgently ensure the safety of the occupant. Examples of such the output event include an event in which forgetting to switch the parking braking switch is detected and an event in which forgetting to turn off the headlight switch or the wiper switch is detected are assumed. These output events typically occur at a start or a stop of the vehicle 100. Therefore, it is considered that the driving speed is low and a collision damage mitigation system is easy to operate. Therefore, in such a case, the start timing of the blowing sound is postponed.

As a case of providing medium urgency information, it is assumed a case where an output event that is not classified into the two cases described above occurs. Examples of such the output event, an event in which the unclosed state of the door is detected and an event in which the unbelted state of the seat belt is detected are assumed. In such cases, the start timing of the blowing sound is to a default value.

In the examples described here, the importance is classified from a viewpoint that ensures the safety of the occupant while the vehicle 100 is driving. The importance may be classified from another viewpoint. In another example, the importance is classified from a viewpoint that ensures the safety of the occupant while the automated driving control is executed. In this case, the event in which the unbelted state of the seat belt is detected corresponds to the output event in which the safety of the occupant is urgently ensured. An event in which a switch to a manual driving is requested also corresponds to the output event with high urgency. On the other hand, an event in which an automated start is notified corresponds to the output event with low urgency. An event in which an automated-lane change is notified corresponds to the output event with medium urgency. In addition, although the importance is classified into three stages here, it may be classified into two stages or may be classified into four or more stages.

3. Specific Processing

3-1. First Processing Example

Figure 7:
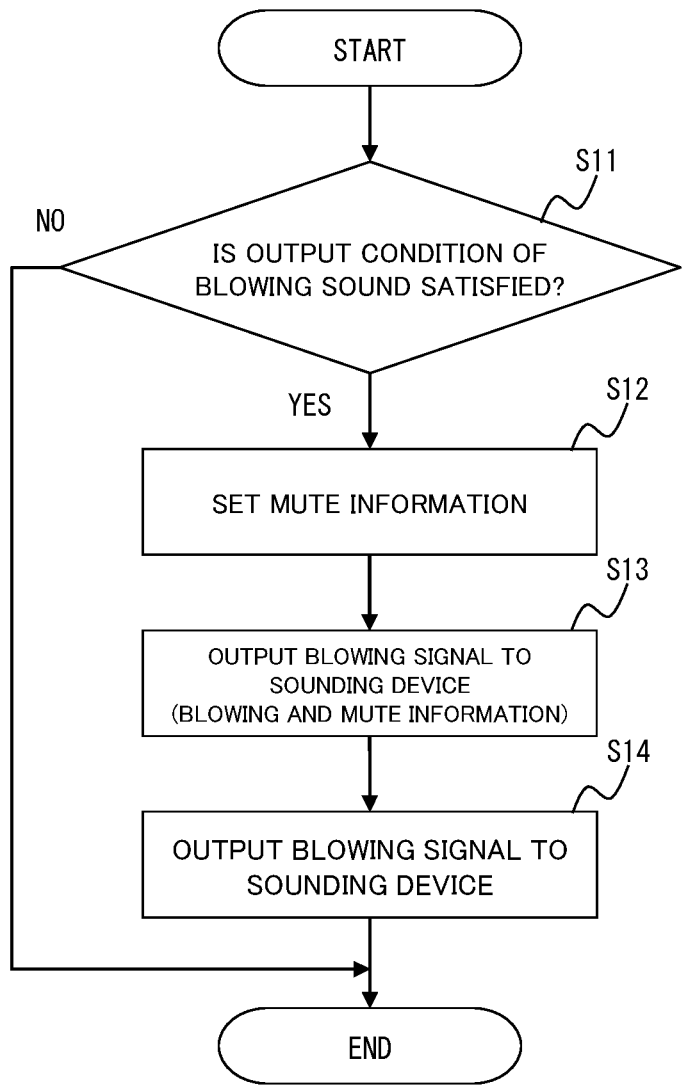
FIG. 7 is a flowchart showing a first processing example when a sound output controller (a processor) executes output state control.

FIG. 7 is a flowchart showing a first processing example when the sound output controller 50 (the processor) executes the output state control. The flow chart shown in FIG. 7 is repeatedly executed at a predetermined control cycle.

In the routine shown in FIG. 7, first, it is judged whether or not the output condition of the blowing sound is satisfied (step S11). As mentioned earlier, the output condition is defined for each output event. If it is determined that the output condition is not satisfied, the processing of the output state control ends.

If the judgement result of the step S11 is positive, processing of steps S12 to S14 is executed. Note that the processing of step S14 may be executed before the processing of the step S12, or may be executed between the processing of the step S12 and the processing of the step S13.

In the step S12, the mute information is set. When the judgment of the step S11 is executed, the output event that is set as the judgment target has already been specified. Therefore, when the judgement result of the step S11 is positive, the mute information (i.e., data of the standby time TSB) corresponding to this output event is specified.

In the step S13, the blowing signal is outputted to the sounding device 80. This blowing signal includes not only the blowing information but also the mute information that was specified in the step S12. Note that the blowing information (i.e., the data of the blowing sound) is specified to the one corresponding to the output event that was set as the judgment target in the step S11.

In the step S14, the mute signal is outputted to the sound source device 60. The mute signal is outputted for a predetermined period. Note that the predetermined period is specified to the one corresponding to the output event that was set as the judgment target of the step S11.

3-2. Second Processing Example

Figure 8:
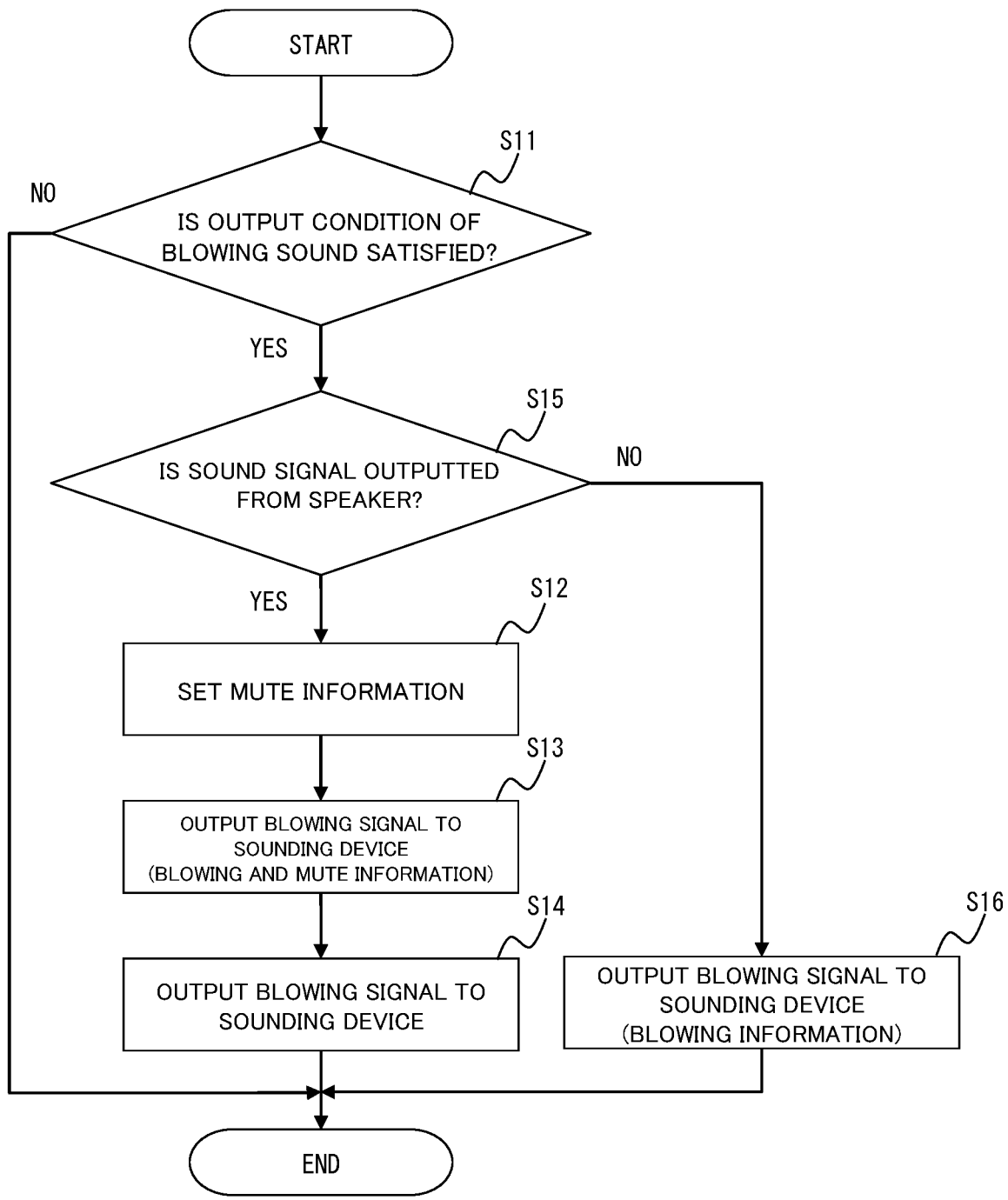
FIG. 8 is a flowchart showing a second processing example when the sound output controller (the processor) executes the output state control.

FIG. 8 is a flowchart showing a second processing example when the sound output controller 50 (the processor) executes the output state control. Note that the flow chart shown in FIG. 8 is repeatedly executed at a predetermined control cycle.

In the example shown in FIG. 8, the processing of the step S15 is executed between the processing of the step S11 and the processing of the step S12. In the S15, it is judged whether or not the sound signal is outputted from the speaker 70. Whether or not the sound signal is outputted from the speaker 70 is judged by, for example, obtaining an operation information from to sound source device 60. If the judgement result of the step S15 is positive, processing of the steps S12 to S14 is executed.

If judgement result in step S15 is negative, the blowing signal is outputted to the sounding device 80 (step S16). This blowing signal includes only the blowing information. If the judgement result of the step S15 is negative, there is no need to set the mute information. Therefore, when the processing of the step S16 is executed, the processing of the steps S12 to S14 is omitted in such a case.

4. Effect

According to the sound output control system described above, the length of the standby time is changed in accordance with the importance of the output event. Therefore, for example, when the start timing is advanced, it is possible to minimize the missing offer of the urgent information and to provide the said information at an earlier timing. On the other hand, when the start timing is postponement, it is possible to suppress the provision of the less urgent information from being extremely delayed and provide the said information to the occupant reliably. As described above, according to sound output control system, it is possible to suppress the missing offer of the information during the mute period and also suppress the delay of the provision of the information.

What is claimed is:

1. A sound output control system mounted on a vehicle, comprising:
    a sound source device which is configured to output a sound signal to a speaker;
    a sounding device which is configured to output a blowing sound inside a vehicle;
    an information acquisition device which is configured to obtain driving environment information of the vehicle; and
    a controller which is configured to execute output state control in which an output status of the sound signal and the blowing sound based on the driving environment information,
    wherein, in the output state control, the controller is configured to:
    judge, based on the driving environment information, whether or not an output condition of the blowing sound is satisfied; and
    if it is judged that the output condition is satisfied, output a mute signal to the sound source device to mute the output of the sound signal and also output a blowing signal including mute information to the sounding device,
        wherein the mute information includes information on a start timing to output the blowing sound,
            wherein the start timing is variably set in accordance with an importance of the information provided to an occupant of the vehicle.

2. The sound output control system according to claim 1, wherein the start timing is set to an earlier timing as the importance becomes higher.

3. The sound output control system according to claim 2, wherein a mute period indicating a period during which the mute signal is outputted from the controller is shortened in accordance with an advance time of the start timing.

4. The sound output control system according to claim 1, wherein the start timing is set to a later timing as the importance becomes lower.

5. The sound output control system according to claim 4, wherein a mute period indicating a period during which the mute signal is outputted from the controller is extended in accordance with a postponement time of the start timing.

6. The sound output control system according to claim 1, wherein the start timing is calculated by adding a standby time, which is variably set in accordance with the importance, to a time at which the mute signal is outputted.

* * * * *